(12) United States Patent
Chang

(10) Patent No.: US 6,315,015 B1
(45) Date of Patent: Nov. 13, 2001

(54) WOOD PLANING MACHINE PROVIDED WITH A CUTTER LOCKING DEVICE

(75) Inventor: Chiu-Tsun Chang, Taichung (TW)

(73) Assignee: P & F Brother Industrial Corporation, Taichung (TW)

( * ) Notice: Subject to any disclaimer, the term of this patent is extended or adjusted under 35 U.S.C. 154(b) by 0 days.

(21) Appl. No.: 09/680,502

(22) Filed: Oct. 5, 2000

(51) Int. Cl.$^7$ .................................................. B27C 1/00
(52) U.S. Cl. ................................... 144/117.1; 144/114.1; 144/130; 409/241
(58) Field of Search ................................ 144/114.1, 116, 144/117.1, 129, 130, 2.1, 329, 373; 409/228, 232, 234, 241

(56) References Cited

U.S. PATENT DOCUMENTS 5,675,903 * 10/1997 Cole .................................... 144/117.1
5,794,675 * 8/1998 Garcia ................................ 144/117.1

\* cited by examiner

*Primary Examiner*—W. Donald Bray
(74) *Attorney, Agent, or Firm*—Finnegan, Henderson, Farabow, Garrett & Dunner, L.L.P.

(57) ABSTRACT

A wood planing machine includes a machine base having first and second mounting sides. First and second pairs of posts are fixed on the machine base at the first and second mounting sides, respectively. A cutter carriage is disposed above the machine base, and has opposite end portions mounted respectively, vertically and movably on the posts. A cutter unit has first and second shaft portions journalled to the first and second end portions of the cutter carriage. The second shaft portion is formed with a first engagement section. A cutter locking device includes a locking plate mounted movably on the second end portion of the cutter carriage, and having a vertical plate portion disposed adjacent to the second shaft portion, and a horizontal plate portion disposed below the second shaft portion and formed with a second engagement section. A biasing unit biases the locking plate to move upwardly on the second end portion of the cutter carriage to an upper position to engage the first and second engagement sections, thereby preventing rotation of the cutter unit relative to the carriage. The locking plate is movable forcibly to a lower position to disengage the first and second engagement sections from each other.

5 Claims, 5 Drawing Sheets

WOOD PLANING MACHINE PROVIDED WITH A CUTTER LOCKING DEVICE

BACKGROUND OF THE INVENTION

1. Field of the Invention

The invention relates to a wood planing machine, more particularly to a wood planing machine provided with a cutter locking device for locking a cutter unit when the cutter unit is at a non-operative state.

2. Description of the Related Art

Referring to FIG. 1, a conventional wood planing machine is shown to include an elongated machine base 10, first and second pairs of posts 100, a cutter carriage 11, vertical first and second threaded rods (not visible), carriage fastening means, an elongated cutter unit 12, and a cutter locking device 17.

As illustrated, the machine base 10 has opposed first and second mounting sides spaced apart from each other in a longitudinal direction, and opposed feed-in and take-out sides spaced apart from each other in a transverse direction. The first and second pairs of posts 100 are fixed on the machine base 10 at the first and second mounting sides, respectively.

The cutter carriage 11 is disposed above the machine base 10, and has first and second end portions 110 mounted respectively, vertically and movably on the first and second pairs of posts 100 for moving the cutter carriage 11 along the posts 100, thereby adjusting height of the cutter carriage 11 relative to the machine base 10.

The carriage fastening means fastens releasably the carriage 11 on the first and second pairs of posts 100 after adjusting the height of the carriage 11 relative to the machine base 10.

The cutter unit 12 is disposed to extend in the longitudinal direction, and has first and second shaft portions 120 journalled to the first and second end portions 110 of the cutter carriage 11.

The cutter locking device includes an inverted L-shaped locking member 17 mounted pivotally on an outer surface of the second end portion 110 of the cutter carriage 11 above the second shaft portion 120 via a pivot pin 171, a pair of engagement grooves 121 formed in an outer surface of the second shaft portion 120 in a radial direction, and a biasing unit 18 which biases a first arm portion 172 of the locking member 17 to rotate about the pin 171 in a direction in such a manner that an engaging tongue 173 of a second arm portion 174 engages one of the engagement grooves 121 in the cutter unit 12, thereby preventing rotation of the cutter unit 12 relative to the carriage 11 and disposing the cutter unit 12 at a locked position.

The cutter carriage 11 further includes a waste passage 15 formed in an outer surface of the second end portion 110 thereof at an elevation above the second shaft portion 120, and a waste collection member 16 which is inserted removably into the waste passage 15 for guiding waste that results from operation of the cutter unit 12 and which presses the first arm portion 172 of the locking member 17 against biasing action of the biasing unit 18, thereby removing the engaging tongue 173 from the engagement groove 121 and correspondingly permitting rotation of the cutter unit 12 relative to the cutter carriage 11, and disposing the cutter unit 12 at an unlocked position.

One disadvantage that results from the use of the aforesaid conventional wood planing machine resides in that the locking member 17 is mounted pivotally on the carriage 11, thereby affecting adversely the locking effect thereof.

SUMMARY OF THE INVENTION

Therefore, the object of this invention is to provide a wood planing machine which is provided with a cutter locking device which is clear of the aforementioned drawback that results from the use of the conventional wood planing machine.

Accordingly, the wood planing machine of the present invention includes an elongated machine base, first and second pairs of posts, a cutter carriage, carriage fastening means, an elongated cutter unit, and a cutter locking device. The machine base has a top surface, opposed first and second mounting sides spaced apart from each other in a longitudinal direction, and opposed feed-in and take-out long sides spaced apart from each other in a transverse direction. The first and second pairs of posts are fixed on the top surface of the machine base at the first and second mounting sides, respectively. The cutter carriage is disposed above the machine base, and has first and second end portions mounted respectively, vertically and movably on the first and second pairs of posts for moving the cutter carriage along the posts, thereby adjusting height of the cutter carriage relative to the machine base. The carriage fastening means fastens releasably the carriage on the first and second pairs of posts after adjusting the height of the carriage relative to the machine base. The cutter unit is disposed to extend in the longitudinal direction, and has first and second shaft portions journalled to the first and second end portions of the cutter carriage. The second shaft portion is formed with a first engagement section. The cutter locking device includes a locking plate and a biasing unit. The locking plate is mounted movably and vertically on an outer surface of the second end portion of the cutter carriage, and has a vertical plate portion disposed adjacent to the second shaft portion, and a horizontal plate portion which extends integrally, laterally and outwardly from a lower end of the vertical plate portion so as to be disposed below the second shaft portion and which is formed with a second engagement section. The biasing unit biases the locking plate to move upwardly on the outer surface of the second end portion of the cutter carriage to an upper position to engage the first and second engagement sections, thereby preventing rotation of the cutter unit relative to the carriage. The locking plate is movable forcibly against biasing action of the biasing unit to a lower position so as to disengage the first and second engagement sections from each other, thereby permitting rotation of the cutter unit relative to the carriage.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
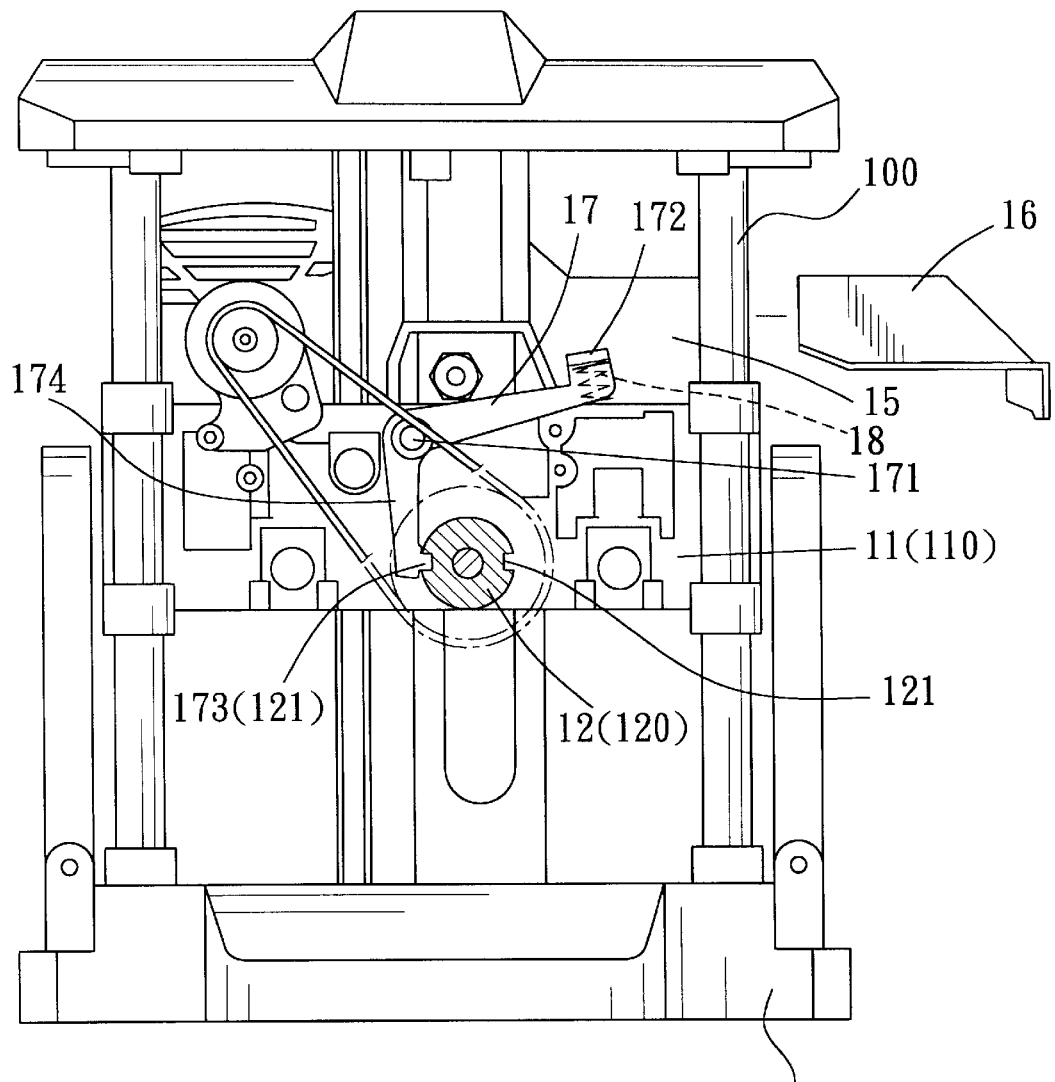
FIG. 1 is a side view of a conventional wood planing machine provided with a cutter locking device.
Figure 2:
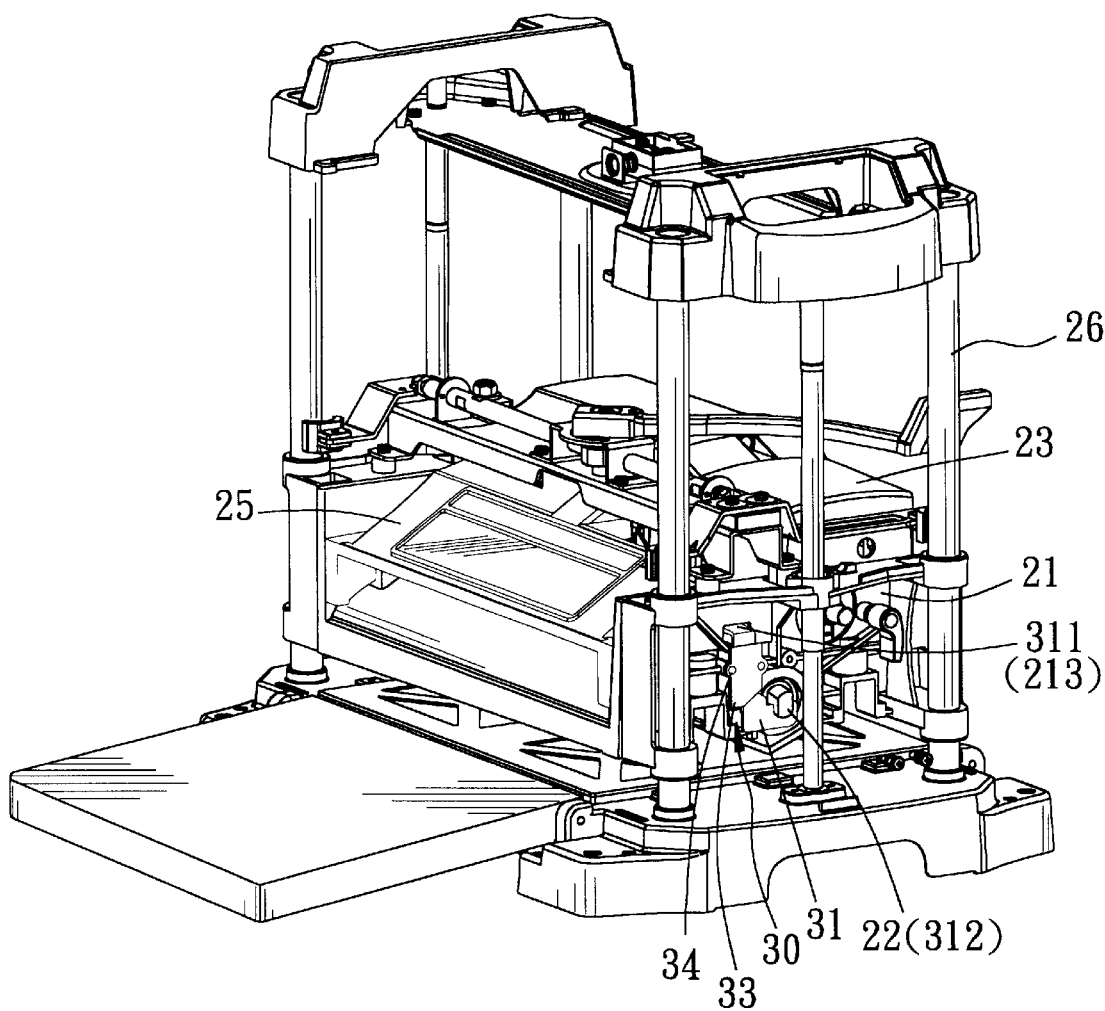
FIG. 2 is a perspective view of the preferred embodiment of a wood planing machine of the present invention provided with a cutter locking device.
Figure 3:
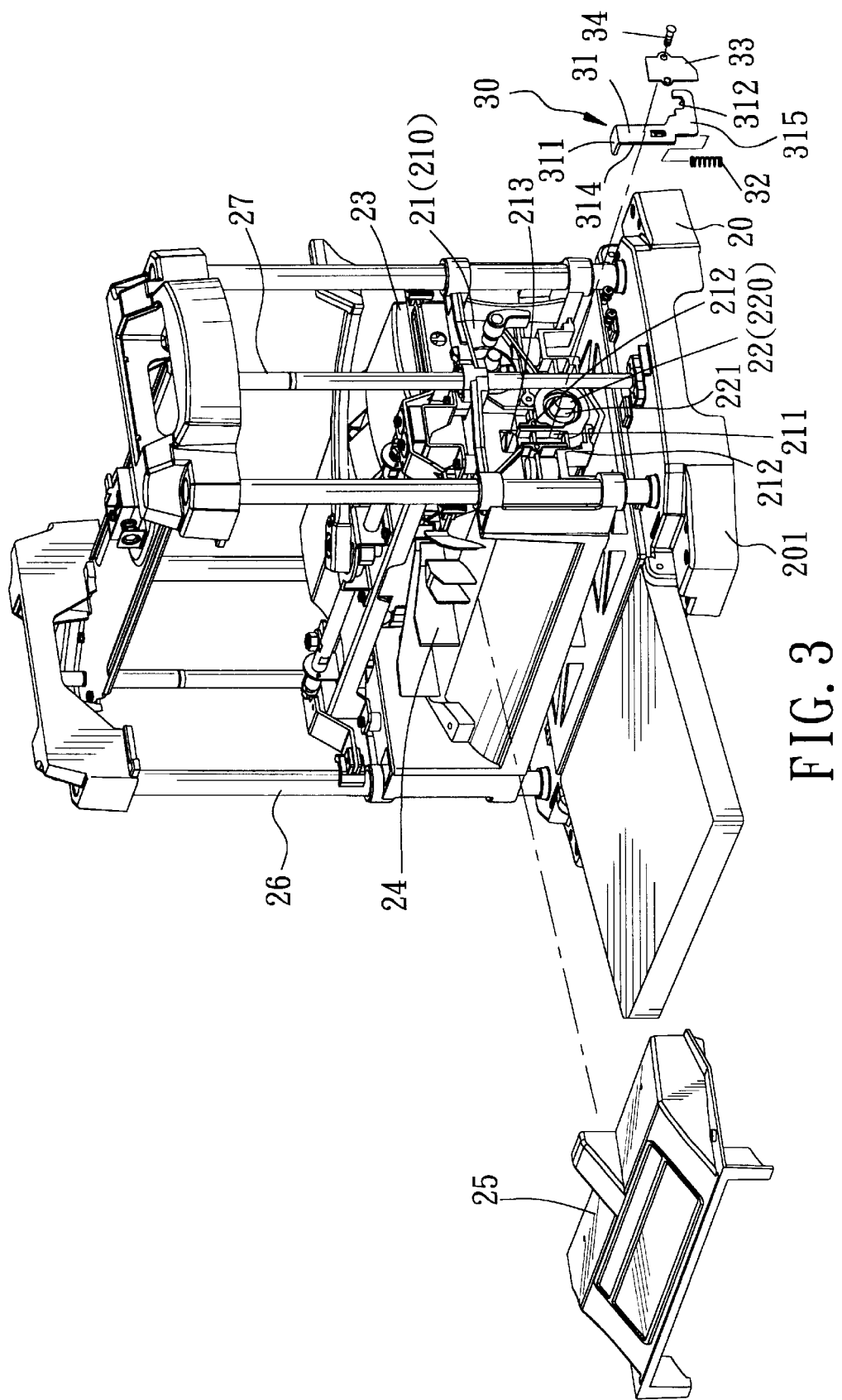
FIG. 3 is a partly exploded perspective view of the preferred embodiment, in which a locking plate and a waste collecting member are removed from a cutter carriage.

Referring to FIGS. 2 and 3, the preferred embodiment of a wood planing machine of this invention is shown to include an elongated machine base 20, first and second pairs of posts 26, a cutter carriage 21, carriage fastening means 23, an elongated cutter unit 22, and a cutter locking device 30.

As illustrated, the machine base 20 has opposed first and second mounting sides 201 spaced apart from each other in a longitudinal direction, and opposed feed-in and take-out long sides spaced apart from each other in a transverse direction.

The first and second pairs of posts 26 are fixed on the top surface of the machine base 20 at the first and second mounting sides 201, respectively.

The cutter carriage 21 is disposed above the machine base 20, and has first and second end portions 210 mounted respectively, vertically and movably on the first and second pairs ofposts26 for moving the cutter carriage 21 along the posts 26, thereby adjusting height of the cutter carriage 21 relative to the machine base 20.

The carriage fastening means 23 is provided on the cutter carriage 21, and is operably connected to the first and second pairs of posts 26 for fastening the carriage 21 to the posts 26 after height adjustment of the cutter carriage 21 by virtue of rotation of two threaded rods 27 which are mounted rotatably on the machine base 20 (see FIG. 3). Since the structure of the carriage fastening means 23 is not pertinent to the present invention, a detailed description thereof will be omitted herein for the sake of brevity.

The cutter unit 22 is disposed to extend in the longitudinal direction, and has first and second shaft portions 220 journalled to the first and second end portions 210 of the cutter carriage 21 in such a manner that the second shaft portion 220 is exposed to the second end portion 210 of the cutter carriage 21. The second shaft portion 22 is formed with a first engagement section 221. Preferably, the first engagement section 221 of the cutter unit 22 is shaped as an axially extending projection that has two opposed vertical side surfaces.

The cutter locking device 30 includes a locking plate 31, and a biasing unit 32. The locking plate 31 is mounted movably and vertically on an outer surface of the second end portion 210 of the cutter carriage 21, and has a vertical plate portion 314 which is disposed adjacent to the second shaft portion 220, and a horizontal plate portion 315 which extends integrally, laterally and outwardly from a lower end of the vertical plate portion 314 so as to be disposed below the second shaft portion 220 and which is formed with a second engagement section 312. The second engagement section 312 of the locking plate 31 is shaped as a notch that engages fittingly the projection of the cutter unit 22. The biasing unit 32 biases the locking plate 31 to move upwardly on the outer surface of the second end portion 210 of the cutter carriage 21 to an upper position to engage the first and second engagement sections 221,312, thereby preventing rotation of the cutter unit 22 relative to the carriage 21. The locking plate 31 is movable forcibly against biasing action of the biasing unit 32 to a lower position so as to disengage the first and second engagement sections 221,312 from each other, thereby permitting rotation of the cutter unit 22 relative to the carriage 21.

In the preferred embodiment, the carriage 21 further includes a waste passage 24 formed therein at an elevation above the second shaft portion 220, and a waste collecting member 25 disposed removably in the waste passage 24 and adapted to collect waste resulting from operation of the cutter unit 22 when the locking plate 31 is at the upper position.

Figure 5:
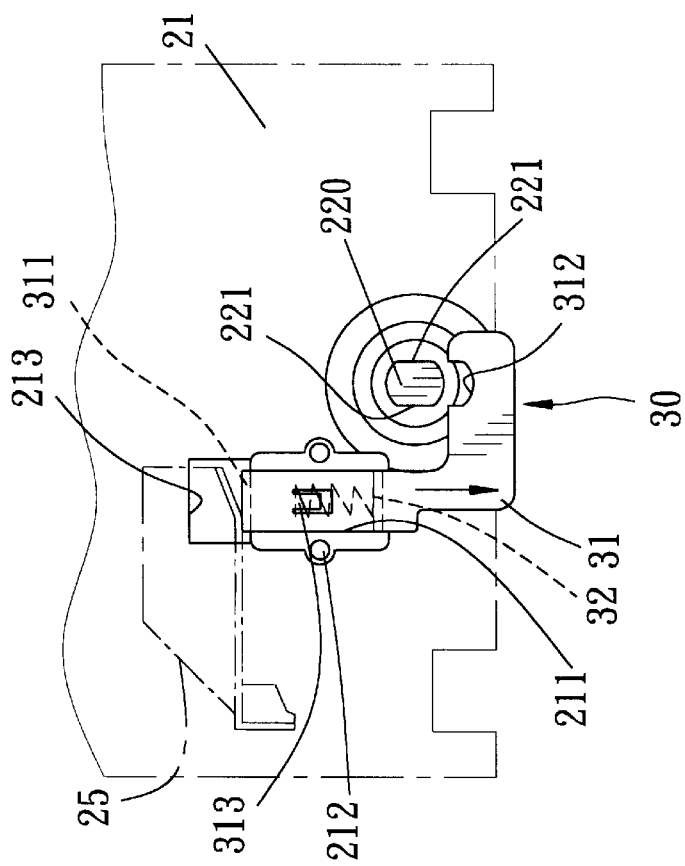
FIGS. 4 and 5 respectively show a partly sectional view and a schematic side view of the preferred embodiment, illustrating how the locking plate is moved to a lower position so as to permit rotation of the cutter unit.
Figure 4:
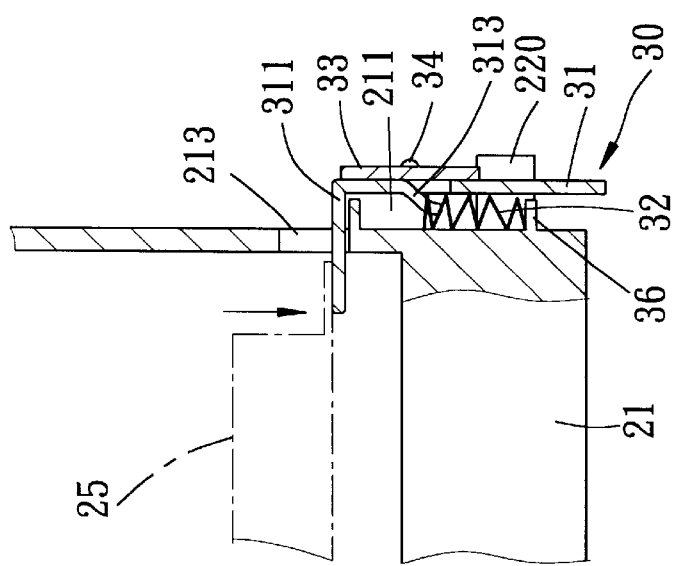
Figure 7:
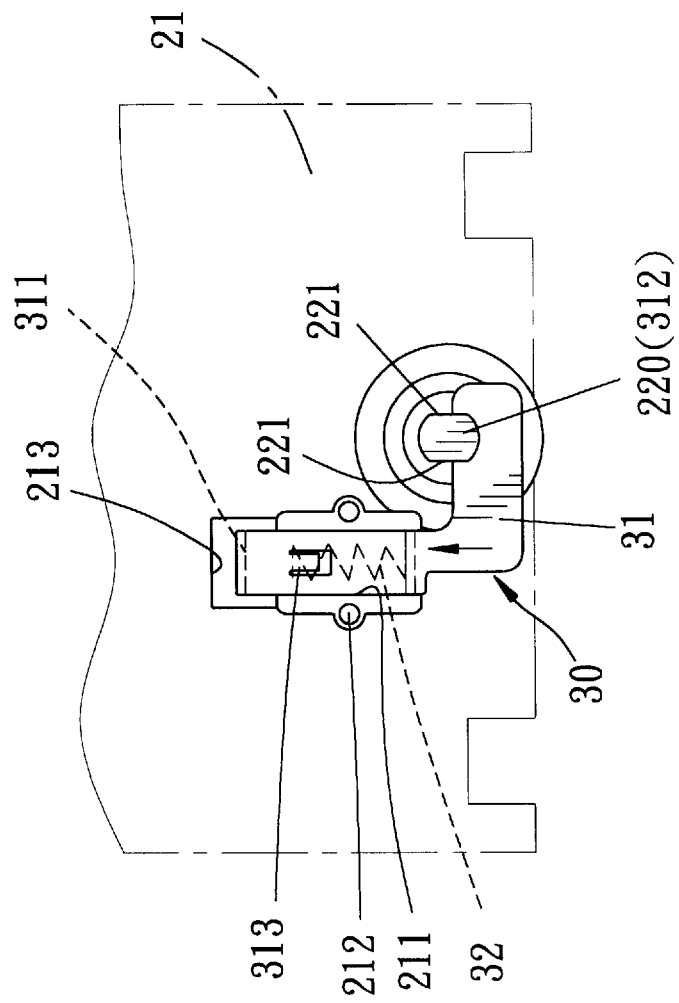
FIGS. 6 and 7 respectively show a partly sectional view and a schematic side view of the preferred embodiment, illustrating how the locking plate is disposed at an upper position to lock the cutter unit against rotation.
Figure 6:
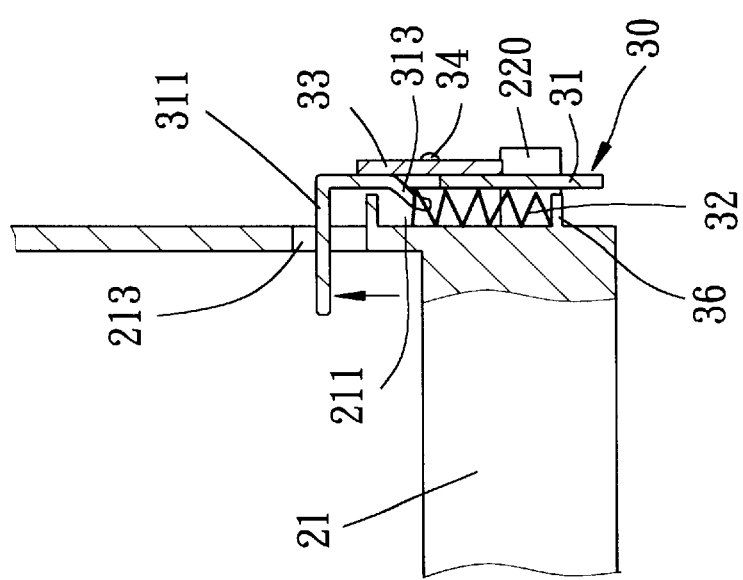

The cutter locking device 30 further includes a plate-retention port 213 formed in the outer surface of the second end portion 210 of the carriage 21 above the second shaft portion 220 and in communication with the waste passage 24. The locking plate 31 further has a fixed insert element 311 that extends perpendicularly from an upper end of the vertical plate portion 314 and into the plate-retention port 213 in the carriage 21 and that is capable of being pushed downwardly by the waste collecting member 25 to the lower position, as shown in FIGS. 4 and 5. The waste collecting member 25 can be removed from the waste passage 24 when the cutter unit 220 is not in operation. Under such a condition, the locking plate 31 is biased by virtue of the biasing unit 32 to the upper position, as best shown in FIGS. 6 and 7.

The carriage 21 further includes a vertical plate-sliding slot 211 formed in the outer surface of the second end portion 210 of the carriage 21 within which the vertical plate potion 314 of the locking plate 31 is slidably disposed, and a spring-mounting stub 36 fixed in a bottom surface of the sliding slot 211. The biasing unit 32 includes a compression spring which is disposed in the sliding slot 211 and which has a lower end that is fixed to the spring-mounting stub 36 and an upper end that is fixed to a horizontal protrusion 313 on the vertical plate portion 314 below the insert element 311 and that biases the locking plate 31 to the upper position. Preferably, a vertical plate cover 33 is mounted removably on the outer surface of the second end portion 210 of the carriage 21 by means of screws 34 which engage threaded holes 212 in the carriage 21 so as to conceal the sliding slot 211.

With this invention thus explained, it is apparent that numerous modifications and variations can be made without departing from the scope and spirit of this invention. It is therefore intended that this invention be limited only as indicated in the appended claims.

I claim:

1. A wood planing machine comprising:

an elongated machine base having a top surface, opposed first and second mounting sides spaced apart from each other in a longitudinal direction, and opposed feed-in and take-out long sides spaced apart from each other in a transverse direction;

first and second pairs of posts fixed on said top surface of said machine base at said first and second mounting sides, respectively;

a cutter carriage disposed above said machine base, and having first and second end portions mounted respectively, vertically and movably on said first and second pairs of posts for moving said cutter carriage along said posts, thereby adjusting height of said cutter carriage relative to said machine base;

carriage fastening means for releasably fastening said carriage on said first and second pairs of posts after adjusting the height of said carriage relative to said machine base;

an elongated cutter unit disposed to extend in the longitudinal direction, and having first and second shaft portions journalled to said first and second end portions of said cutter carriage, said second shaft portion being formed with a first engagement section; and a cutter locking device including a locking plate mounted vertically and movably on an outer surface of said second end portion of said cutter carriage, and having a vertical plate portion disposed adjacent to said second shaft portion, and a horizontal plate portion which extends integrally, laterally and outwardly from a lower end of said vertical plate portion so as to be disposed below said second shaft portion and which is formed with a second engagement section, and a biasing unit for biasing said locking plate to move upwardly on said outer surface of said second end portion of said cutter carriage to an upper position to engage said first and second engagement sections, thereby preventing rotation of said cutter unit relative to said carriage, said locking plate being movable forcibly against biasing action of said biasing unit to a lower position so as to disengage said first and second engagement sections from each other, thereby permitting rotation of said cutter unit relative to said carriage.

2. The wood planing machine as defined in claim 1, wherein said carriage further includes a waste passage formed therein at an elevation above said second shaft portion, and a waste collecting member disposed removably in said waste passage for collecting waste resulting from operation of said cutter so as to collect the waste, said cutter locking device further including:

a plate-retention port formed in said outer surface of said second end portion of said carriage above said second shaft portion and in communication with said waste passage, said locking plate further having an insert element that extends perpendicularly from an upper end of said vertical plate portion and into said plate-retention port in said carriage and that engages said waste collecting member, thereby disposing said locking plate at said lower position;

whereby, removal of said waste collecting member from said waste passage during non-operation of said cutter unit results in movement of said locking plate to said upper position.

3. The wood planing machine as defined in claim 2, wherein said carriage includes a vertical plate-sliding slot formed in said outer surface of said second end portion of said carriage within which said vertical plate portion of said locking plate is slidably disposed, and a spring-mounting stub fixed in a bottom surface of said sliding slot, said biasing unit including a compression spring which is disposed in said sliding slot and which has a lower end that is fixed to said spring-mounting stub and an upper end that is fixed to said vertical plate portion below said insert element and that biases said locking plate to said upper position.

4. The wood planing machine as defined in claim 3, wherein said cutter locking device further includes a vertical plate cover mounted removably on said outer surface of said second end portion of said carriage so as to conceal said sliding slot.

5. The wood planing machine as defined in claim 1, wherein said first engagement section of said cutter unit is shaped as an axially extending projection that has two opposed vertical side surfaces, and said second engagement section of said locking plate is shaped as a notch that engages fittingly said projection.

* * * * *